(12) United States Patent
Koskela et al.

(10) Patent No.: US 9,232,514 B2
(45) Date of Patent: Jan. 5, 2016

(54) APPARATUS AND METHOD FOR A COMMUNICATION SYSTEM

(71) Applicant: Broadcom Corporation, Irvine, CA (US)

(72) Inventors: Timo K. Koskela, Oulu (FI); Sami Jukka Hakola, Kempele (FI); Samuli Turtinen, Ii (FI); Anna Pantelidou, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 192 days.

(21) Appl. No.: 13/849,894

(22) Filed: Mar. 25, 2013

(65) Prior Publication Data

US 2014/0198735 A1    Jul. 17, 2014

(30) Foreign Application Priority Data

Mar. 27, 2012    (GB) .................................... 1205390.6

(51) Int. Cl.
*H04Q 7/00* (2006.01)
*H04W 72/04* (2009.01)
*H04W 74/08* (2009.01)

(52) U.S. Cl.
CPC ............ *H04W 72/042* (2013.01); *H04W 74/08* (2013.01)

(58) Field of Classification Search
None
See application file for complete search history.

(56) References Cited

U.S. PATENT DOCUMENTS

| 2008/0159208 | A1 | 7/2008 | Kloker et al. |
| 2010/0093360 | A1 | 4/2010 | Choi et al. |
| 2011/0128895 | A1* | 6/2011 | Sadek et al. ................. 370/280 |
| 2012/0281643 | A1* | 11/2012 | Sun et al. ..................... 370/329 |
| 2013/0003591 | A1* | 1/2013 | Novak et al. ................. 370/252 |
| 2014/0031031 | A1* | 1/2014 | Gauvreau et al. .......... 455/426.1 |

FOREIGN PATENT DOCUMENTS

EP            2 330 860 A2    6/2011
WO    WO 2012/068731 A1    5/2012

OTHER PUBLICATIONS

M-A. Phan et al., "Flexible Spectrum Usage—How LTE can meet Future Capacity Demands," Powerpoint Presentation, ITG FG 5.2.4 Workshop, Ericsson AB 2010, Jul. 8, 2010 http://www.ikr.uni-stuttgart.de/Content/itg/fg524/Meetings/2010-07-08-Heidelberg/03_ITG524_Heidelberg_Sachs.pdf (33 slides).
NYU•Poly, Polytechnic Institute of NYU, "Center for Advanced Technology in Telecommunications (CATT) Research Overview," http://catt.poly.edu/sites/default/files/files/CATT_Overview%281%29.pdf.
3GPP, "Physical Channels and Modulation (Release 10)" TS 36.211 V10.3.0 (Sep. 2011) (103 pages).
UKIPO Search Report under Section 17 compiled Jul. 27, 2012 which is issued in a related British Application No. GB1205390.6 (1 page).

* cited by examiner

*Primary Examiner* — Duc C Ho
(74) *Attorney, Agent, or Firm* — Foley & Lardner LLP

(57) ABSTRACT

Apparatus and method for communication are provided. The solution includes controlling the communication of a transceiver on shared data channels using a data channel slot including a sensing period and a data period and controlling a transceiver to communicate on common and dedicated control channels on a shared spectrum using control channel slots, each control channel slot including a downlink part and an uplink part, wherein the uplink part occurs at the same time as the sensing period of a data channel slot.

20 Claims, 4 Drawing Sheets

APPARATUS AND METHOD FOR A COMMUNICATION SYSTEM

CROSS REFERENCE TO RELATED APPLICATION

This application claims the benefit under 35 U.S.C. §119 (a) and 37 CFR §1.55 to UK Patent Application No. 1205390.6 filed on Mar. 27, 2012, the entire content of which is incorporated herein by reference.

TECHNICAL FIELD

The exemplary and non-limiting embodiments of the invention relate generally to wireless communication networks. More particularly, some embodiments of the invention relate to communication of control channel on shared bands.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for increasing data rates and higher quality services in the world of mobile communications comes ever increasing demand for better performance of cellular network infrastructures. The increased spectrum requirements due the increased data traffic drives operators seek offloading solutions for their traffic via local nodes providing local access to the Internet to prevent congesting own core network. A wide variety of diverse size of cells and connected devices are proposed in addition to traditional macro and microcells. However, the available frequency resources are limited and need for efficient use of the resources is essential.

Traditional solutions to improve spectrum efficiency cannot support the predicted data traffic in the future. Thus, operators, network and device manufacturers and other players in the field are considering the utilization of license-exempt (LE) or unlicensed frequency bands along with costly licensed spectrum. The LE spectrum can also be called a shared spectrum. Shared spectrum is only lightly regulated; users do not need licenses to exploit them. From the cellular traffic point of view, an interesting shared spectrum band opportunity is Industrial, Scientific and Medical (ISM) bands. The ISM bands are widely used for WLAN and Bluetooth® communication, for example. The ISM bands allow both standardized systems and proprietary solutions to be deployed onto spectrum as far as regulations are followed. The regulations define maximum transmission powers and certain rules for systems for the operation on the band.

Currently it is challenging for many cellular systems such as the third and fourth generation systems long term evolution (LTE, known also as E-UTRA) and long term evolution advanced (LTE-A) to utilise ISM bands for example due to required continuous and synchronous resource allocation for control channels both in downlink and uplink transmission directions.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

In a first exemplary embodiment of the invention, there is an apparatus for a communication system, the apparatus including: at least one processor; and at least one memory including computer program code configured to, with the at least one processor, cause the apparatus at least to perform: causing communication of shared data channels on a shared spectrum using a data channel slot including a sensing period and a data part period; causing communication on shared data channels of an indicator including information on the transmission and format of at least one control part.

In a second exemplary embodiment of the invention, there is an apparatus for a communication system, the apparatus including: at least one processor; and at least one memory including computer program code configured to, with the at least one processor, cause the apparatus at least to perform: controlling the reception of an indicator on shared data channels, the indicator including information on the transmission and format of at least one control part, and utilising, the information when receiving and processing the at least one control part.

In a third exemplary embodiment of the invention, there is a method in a communication system, the method including: causing communication of shared data channels on a shared spectrum using a data channel slot including a sensing period and a data part period; causing communication on shared data channels of an indicator including information on the transmission and format of at least one control part.

In a fourth exemplary embodiment of the invention, there is a method in a communication system, the method including: controlling the reception of an indicator on shared data channels, the indicator including information on the transmission and format of at least one control part, and utilising the information when receiving and processing the at least one control part.

In a fifth exemplary embodiment of the invention, there is a non-transitory computer readable storage medium including a set of computer readable instructions stored thereon, which, when executed by a processing system, cause the processing system to carry out the third exemplary embodiment of the invention.

In a sixth exemplary embodiment of the invention, there is a non-transitory computer readable storage medium including a set of computer readable instructions stored thereon, which, when executed by a processing system, cause the processing system to carry out the fourth exemplary embodiment of the invention.

BRIEF DESCRIPTION OF THE DRAWINGS

Embodiments of the present invention are described below, by way of example only, with reference to the accompanying drawings, in which.

DETAILED DESCRIPTION

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers.

Figure 1:
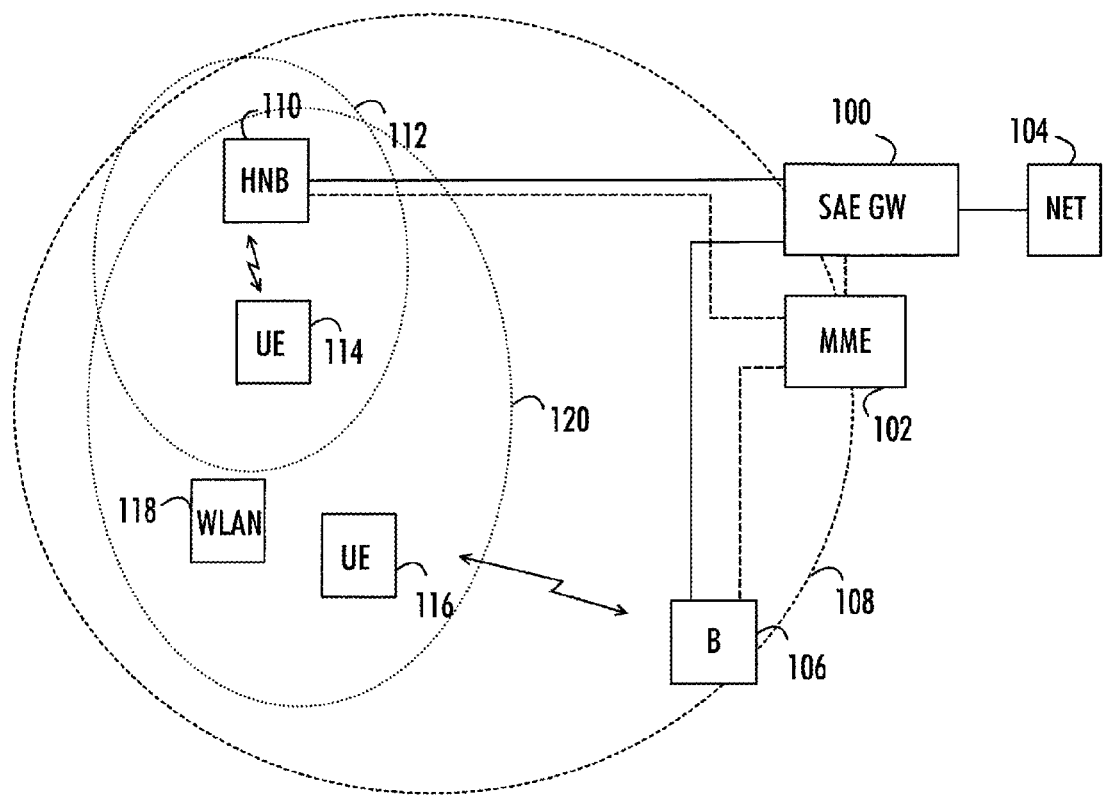
FIG. 1 illustrates an example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also include other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 includes a SAE Gateway 100 and an MME 102. The SAE Gateway 100 provides a connection to Internet 104. FIG. 1 shows an eNodeB 106 serving a macro cell 108. In addition, a local area base stations or Home NodeB HNB 110 with a corresponding coverage area 112 is shown. In this example, the Home NodeB 110 and the eNodeB 106 are connected to the SAE Gateway 100 and the MME 102.

In the example of FIG. 1, user equipment UE 114 is camped on the HNB 110. The UE 116 is camped on the eNodeB 106. Furthermore, a wireless local area (WLAN) base station 118 is transmitting with a coverage area 120.

The eNodeBs (Enhanced node Bs) of a communication system may host the functions for Radio Resource Management: Radio Bearer Control, Radio Admission Control, Connection Mobility Control, Dynamic Resource Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

User equipment UE refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

In an embodiment, at least some of the above connections between NodeB's and UEs utilise an unlicensed or shared spectrum which may be the same as the spectrum used by the WLAN base station 118 or by some other apparatus utilizing ISM spectrum.

The regulations applying to the usage of shared spectrum require different systems to use the available resources in a fair manner without causing excessive interference to other systems using the same resources.

In an embodiment, Listen-Before-Talk (LBT) or channel contention between the devices communicating on the shared spectrum is used to reduce interference. LBT or channel contention may require a device to listen, monitor or measure the usage of a channel for a given time before making the decision whether to transmit on the channel or not. In an embodiment, the device may monitor energy level on a channel and if the level is above a given threshold it may determine that the channel is in use by another device. If the channel or spectrum is used by another device the transmitter is configured to abstain from transmitting or select a different channel.

As most cellular systems require that control channel transmissions are continuous and synchronous the restricted use of resources on shared spectrum is challenging as the resource allocation for control channels both in downlink and uplink transmission directions is problematic. In addition, if LBT type of channel access is utilized, the resource allocation for synchronization signals, critical control channel signalling like HARQ (Hybrid automatic repeat request) feedback is challenging as there is no certainty that resources for the required HARQ feedback for the earlier data transmission can be obtained.

In LTE based systems, dedicated and common control channels include Physical Broadcast Channel PBCH, Physical Control Format indicator Channel PCFICH, Physical Downlink Control Channel PDCCH, Physical HARQ Indicator Channel PHICH, Physical Uplink Shared Channel PUSCH and synchronization signals.

As one skilled in the art is well aware embodiments of the invention are not limited to LTE based systems. The above channels and numerical values below are mentioned as a non-limiting example only.

In general it can be stated that the transmission of an eNodeB in each transmission time interval (TTI) may include a data part and a control part. The data part includes data channels and the control part includes dedicated and common control channels. In general, a transmission time interval may be a slot, a frame or a sub frame or any other suitable unit.

In an embodiment, it is proposed to transmit the control part using the same frequency band of the shared spectrum as the data part. In an embodiment, the control channels are transmitted using a different or partly different frequency band. The control part may or may not be transmitted using frequency hopping. There may be one or more control parts. For example, the base station may normally transmit one control part but if there is need for more control transmission it may additionally transmit an extended control part.

In an embodiment, the base station or eNodeB transmits an indicator including information on the transmission and format of at least one control part. The indicator may be denoted as Control Frame Type Indicator CFTI.

Figure 2A:
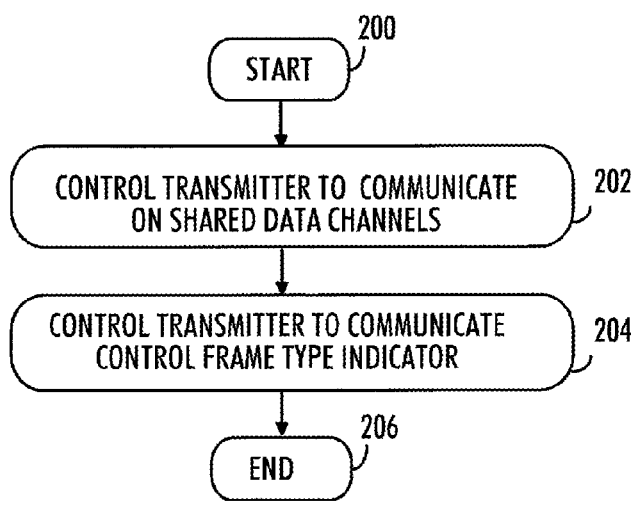
FIGS. 2A and 2B are flowcharts illustrating embodiments of the invention.

FIG. 2A is a flowchart illustrating an embodiment of the invention. In an embodiment, the example relates to the operation of a base station, an eNodeB or an access point. The embodiment starts at step 200.

In step 202, a transmitter is controlled to cause communication of shared data channels on a shared spectrum using a data channel slot including a sensing period and a data part period. Thus in an embodiment, data channels are transmitted using Listen-Before-Talk-type of communication.

In step 204, a transmitter is controlled to cause communication on shared data channels of an indicator including information on the transmission and format of at least one control part.

The process ends in step 206.

Figure 2B:
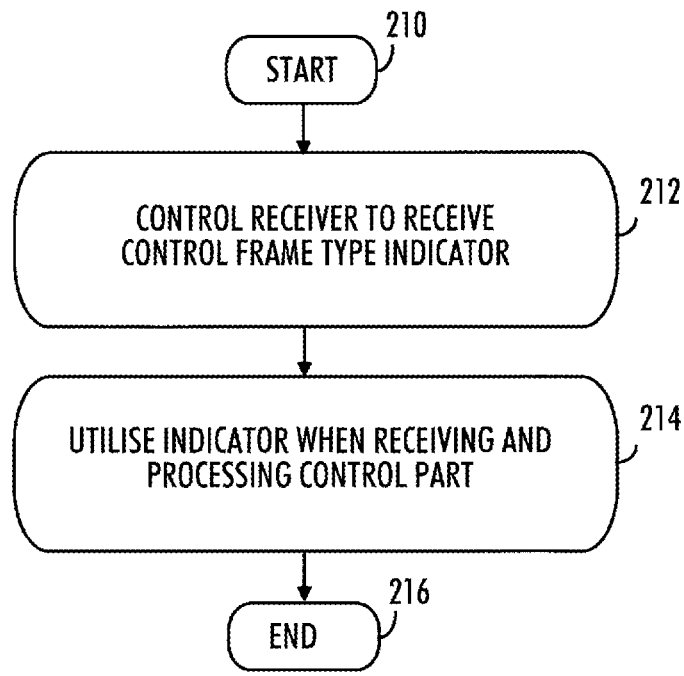

FIG. 2B is a flowchart illustrating an embodiment of the invention. In an embodiment, the example relates to the operation of user equipment. The embodiment starts at step 210.

In step 212, the reception of an indicator on shared data channels is controlled. The indicator includes information on the transmission and format of at least one control part.

In step 214, the information of the indicator is utilised when receiving and processing the at least one control part. For example, from the information it may be determined whether there is data transmission on shared spectrum. In addition, the information may indicate that the control part format is one from a set of predetermined formats and the location of the at least one control part on the shared spectrum.

The process ends in step 216.

Figure 3A:
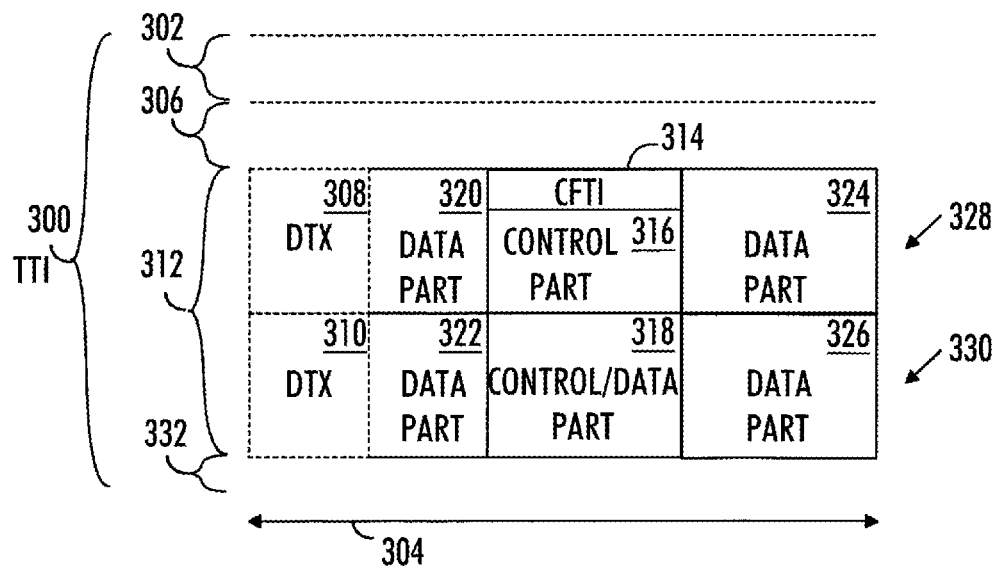
FIGS. 3A, 3B and 3C illustrate examples of downlink channel structure.

FIG. 3A illustrates an example of downlink channels structure where an embodiment of the invention is applied. The figure illustrates a transmission time interval TTI 300. In this example, a transmission may include a data part and a control part which may be transmitted on a given deployment bandwidth 304.

The TTI includes a sensing part 302. In the sensing part, the transceiver is configured to listen or measure the usage of a channel before making the decision whether to transmit data on the channel or not. If the channel or spectrum is used by another device the transmitter is configured to abstain from transmitting data or select a different channel. The sensing may also denoted as Clear Channel Procedure CCA.

After the sensing part in the TTI follows a frame preparation part 306. In frame preparation part, the sensing result is used to determine the control part format for the current frame. The control part format defines the structure of the control part, i.e. which control channels or control information is sent in the control part. In an embodiment, the control part format is selected from a set of predetermined formats on the basis of the sensing result. Control part may be prepared during the frame preparation part to indicate which UEs are scheduled in the current frame.

In an embodiment, the downlink data frames are coded and/or prepared during the frame preparation phase. In an embodiment, the downlink frames are prepared during the previous TTI and the decision to transmit the frames to certain UEs is based on the sensing results.

For example, in the figure the deployment bandwidth includes partly occupied sections 308, 310 and the eNodeB or access point defers the transmission on those resources (DTX). The DTX could be indicated by not scheduling any UE on those resources (the scheduling grant is omitted during the frame preparation part) or the scheduling grant is transmitted control part but the sensing results are indicated explicitly e.g. in a Control Frame Type Indicator Field (with rough granularity).

Next in the TTI follows in this example the transmission part 312. The transmission part is the actual transmission part of the frame. The transmission part consists of a control part and a data part. The control part includes the resource allocation grants for the current downlink frame or for the next uplink frame. A scheduling grant may also be valid for e.g. downlink TTIs.

The transmission part includes the Control Frame Type indicator Field (CFTI) 314. In this example the CFTI and control parts 316, 318 are transmitted in the deployment bandwidth 304 in the middle of data parts 320, 322, 324 and 326. In this example the CFTI and control part(s) are transmitted using the same frequency band.

In this example the transmission part 312 includes two slots 328, 330.

In an embodiment, the CFTI indicates the format of the control part 316 in the current TTI. The CFTI selection may be based on the sensing results on the deployment bandwidth. In an embodiment, the CFTI indicates the sensing results for the data part. The indicated sensing result may be partial.

In an embodiment, the CFTI includes an indication of an Extended Control Part 318 for the current TTI. Thus, in general a TTI includes one control part, but if need be there may be additional or extended control part or parts. CFTI may be used to indicate the number of control parts to the UE. Extended control part may be used to transmit paging information, for example. If the CTFI indicates that the extension occurs in current TTI, it may be a general indication of a broadcast transmission (system information). This instructs all the devices to decode the extension part.

The extended part 318 can be utilized in flexible manner to extend the control information transmission in frame based LBT-LTE system where the potential bandwidth of the control channel may be limited. In an embodiment, if the CTFI does not indicate any extension for the control part the eNodeB may schedule the resources for data transmission.

Non-limiting examples of the frame formats for the control channel the CTFI could inform include:

Length: 1 slot or 2 slots

DL scheduling, UL scheduling, PHICH, PSS, SSS, PBCH, . . .

DL scheduling, UL scheduling, PHICH, . . .

UL scheduling, PHICH, . . .

PHICH, . . .

Sensing result

Above, DL denotes downlink, UL uplink, PHICH Physical HARQ Indicator Channel, PBCH Physical Broadcast Channel, PSS Primary Synchronization Signal and SSS denotes Secondary Synchronization Signal.

Finally, a TX/RX Switching Time 332 is shown in FIG. 3A. It denotes the time required by a transceiver to switch from transmission (TX) to reception (RX). In practise this part can be included in the sensing part of the next frame. It is shown here for the illustrative purposes.

In the example implementation of FIG. 3, the eNodeB or access point prepares the frame during the sensing part and frame preparation part. Results obtained during the sensing part are utilised when determining CFTI selection.

Regardless of the sensing results the CFTI and the control parts may always be transmitted in the beginning of a downlink frame unless specified otherwise in the system information (e.g. in the main access parameters). Network may configure different transmission intervals for the control part.

Figure 3B:
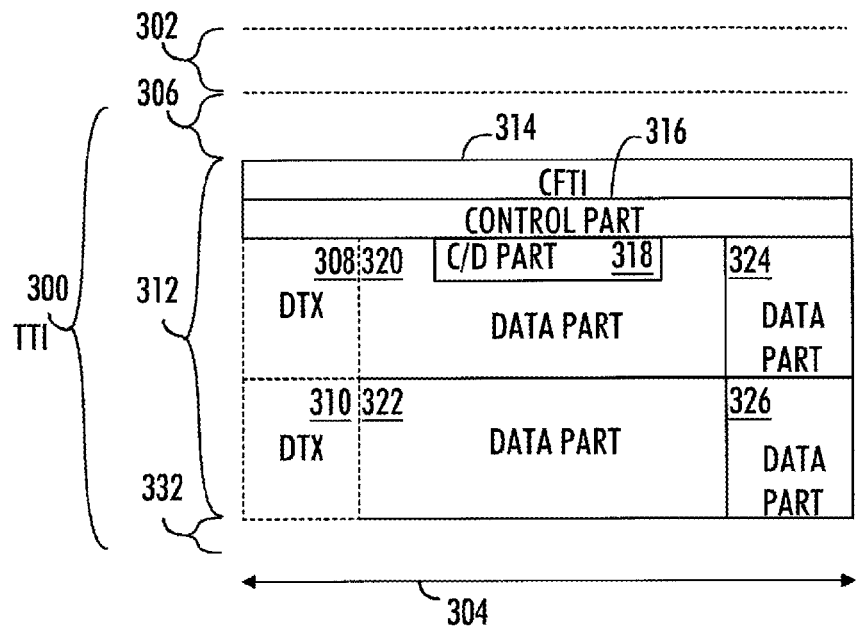

FIG. 3B illustrates another example of the downlink channel structure where an embodiment of the invention is applied. The figure illustrates a transmission time interval TTI 300. In this example, the CFTI control part is transmitted using full deployment bandwidth 304. The transmission on the data resources will be based on the sensing results obtained during the sensing part 302 prior to the Control Information transmission. In an embodiment, the transmission of the control information will occur regardless of the sensing results.

FIG. 3B shows the sensing part 302 and the frame preparation part 306. The CFTI 314 and the control part 316 are transmitted in the beginning of the transmission part 312 using the whole deployment frequency band 304. If needed the transmission part includes extended control part 318. If the extended control part 318 is not transmitted data may be transmitted instead. The existence and location of the extended control part 318 are indicted in the CFTI. The figure shows two DTX parts 308 310 which are not used for transmission. The data parts 320, 322, 324 and 326 are transmitted in the available deployment band.

Figure 3C:
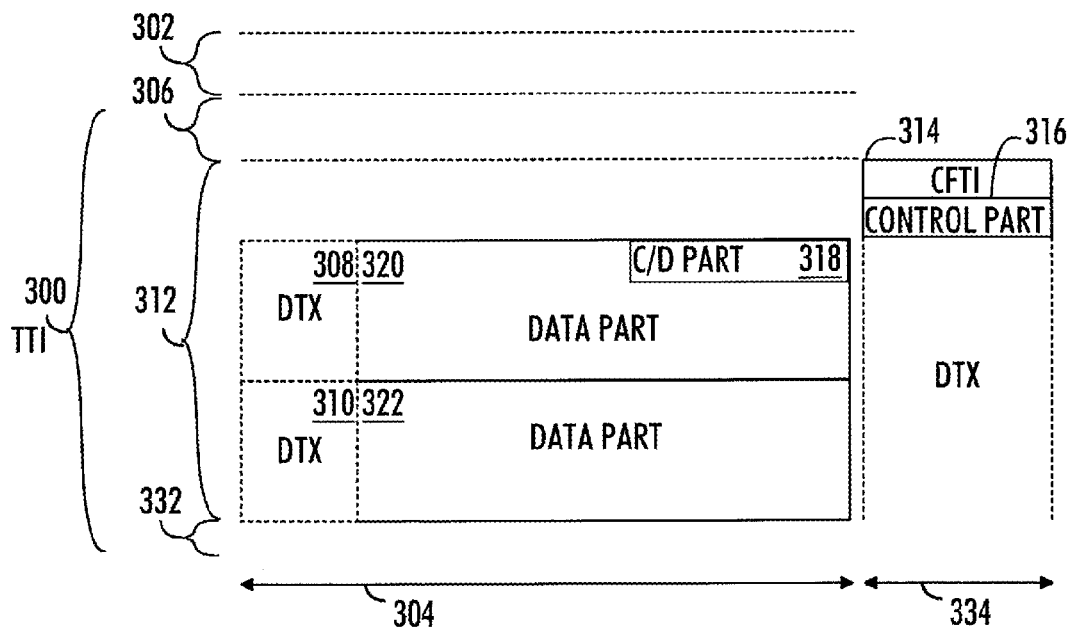

FIG. 3C illustrates another example of the downlink channel structure where an embodiment of the invention is applied. Here the CFTI 314 and the control part 316 are transmitted on a separate control part bandwidth 334. Data parts are not transmitted using the control part bandwidth. If needed the transmission part includes extended control part 318. If the extended control part 318 is not transmitted data may be transmitted instead. The existence and location of the extended control part 318 are indicted in the CFTI.

Figure 4:
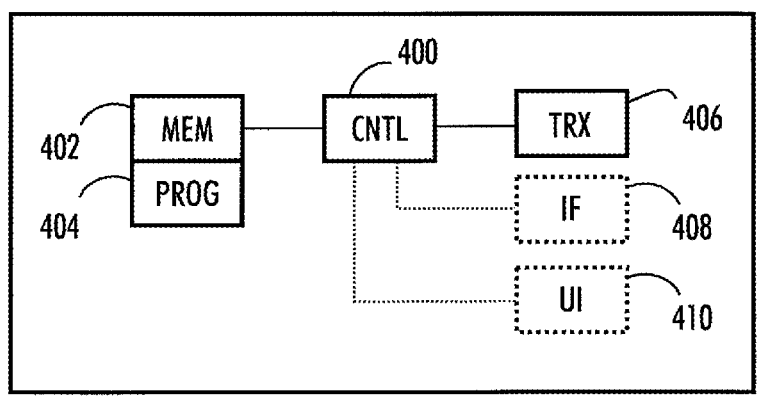
FIG. 4 illustrates an example of an apparatus.

FIG. 4 illustrates an embodiment. The figure illustrates a simplified example of an apparatus applying embodiments of the invention. In some embodiments, the apparatus may be an eNodeB or base station of a communications system. In an embodiment, the apparatus may be an access point of an ad-hoc network. User equipment may also act as an access point to other communication devices or user equipment. The apparatus may also be interpreted as a circuitry or processing unit implementing the required functionality within an eNodeB, base station or access point.

It should be understood that the apparatus is depicted herein as an example illustrating some embodiments. It is apparent to a person skilled in the art that the apparatus may also include other functions and/or structures and not all described functions and structures are required. Although the apparatus has been depicted as one entity, different modules and memory may be implemented in one or more physical or logical entities.

The apparatus of the example includes a control circuitry or processing unit 400 configured to control at least part of the operation of the apparatus.

The apparatus may include a memory 402 for storing data. Furthermore the memory may store software 404 executable by the control circuitry or processing unit 800. The memory may be integrated in the control circuitry.

The apparatus includes a transceiver 406. The transceiver is operationally connected to the control circuitry or processing unit 400. It may be connected to an antenna arrangement (rot shown).

The software 404 may include a computer program including program code means adapted to cause the control circuitry 400 of the apparatus to control the transceiver 406.

The apparatus may further include interface circuitry 408 configured to connect the apparatus to other devices and network elements of communication system, for example to core. This applies especially if the apparatus is an eNodeB or a base station or respective network element. The interface may provide a wired or wireless connection to the communication network. The apparatus may be in connection with core network elements, eNodeB's, Home NodeB's and with other respective apparatuses of communication systems.

The apparatus may further include user interface 410 operationally connected to the control circuitry 400. The user interface may include a display, a keyboard or keypad, a microphone and a speaker, for example. This applies especially if the apparatus is user equipment or respective network element.

In an embodiment, the control circuitry or processing unit 400 cause communication of shared data channels on a shared spectrum using a data channel slot including a sensing period and a data part period and cause communication on shared data channels of an indicator including information on the transmission and format of at least one control part.

In an embodiment, the control circuitry or processing unit 400 cause the reception of an indicator on shared data channels, the indicator including information on the transmission and format of at least one control part, and cause the utilisation of the information when receiving and processing the at least one control part.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may include a working memory (RAM), a central processing unit (CPU), and a system clock. The CPU may include a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor for multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device, An embodiment provides a computer program embodied on a distribution medium, including program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

What is claimed is:

1. An apparatus for a communication system, the apparatus comprising:
    at least one processor; and
    at least one memory having instructions stored thereon that, when executed by the at least one processor, cause the at least one processor to:
    cause communication on shared data channels of a shared spectrum using a data channel slot comprising a sensing period and a data part period, the sensing period configured to allow one or more devices sharing the shared data channels to detect usage of the shared data channels; and
    cause communication on the shared data channels of an indicator comprising information on the transmission and format of at least one control part, the at least one control part indicating resource allocation for transmissions in at least one of a current downlink data part or a next uplink data part in the data channel slot on the shared data channels.

2. The apparatus of claim 1, the apparatus being configured to:
    control transmission on the shared data channels using a downlink data channel slot by sensing traffic on the shared spectrum to obtain a sensing result during the sensing period of the data channel slot and make a decision whether to transmit or not during a data part period of the data channel slot on the basis of the sensing result.

3. The apparatus of claim 2, the apparatus being configured to determine the control part format on the basis of the sensing result.

4. The apparatus of claim 2, the apparatus being configured to select the control part format from a set of predetermined formats on the basis of the sensing result.

5. The apparatus of claim 1, wherein the indicator of the control part format comprises an indication of a number of control parts to be transmitted.

6. The apparatus of claim 5, wherein the indicator comprises an indication of whether the control part includes an extended control part, the indication of whether the control part includes an extended control part used to determine whether data or control information is transmitted within a time period on the shared data channels.

7. The apparatus of claim 1, wherein the instructions are configured to cause the at least one processor to operate in at least one of a Universal Mobile Telecommunication System Long-Term Evolution network or a Universal Mobile Telecommunication System Long-Term Evolution Advanced network.

8. An apparatus for a communication system, the apparatus compring:
    at least one processor; and
    at least one memory having instructions stored thereon that, when executed by the at least one processor, cause the at least one processor to:
    control the reception of an indicator on shared data channels, the indicator comprising information on the transmission and format of at least one control part, the at least one control part indicating resource allocation for transmissions in at least one of a current downlink data part or a next uplink data part in a data channel slot on the shared data channels, and
    utilize the information when receiving and processing the at least one control part.

9. The apparatus of claim 8, wherein the instructions are configured to cause the at least one processor to determine from the indicator whether there is data transmission on shared spectrum.

10. The apparatus of claim 8, wherein the control part format is one from a set of predetermined formats.

11. The apparatus of claim 8, wherein the instructions are configured to cause the at least one processor to operate in at least one of a Universal Mobile Telecommunication System Long-Term Evolution network or a Universal Mobile Telecommunication System Long-Term Evolution Advanced network.

12. The apparatus of claim 8, further comprising determining whether data or control information is transmitted within a time period on the shared data channels using the indicator.

13. A method in a communication system, the method comprising:
    causing communication on shared data channels of a shared spectrum using a data channel slot comprising a sensing period and a data part period, the sensing period configured to allow one or more devices sharing the shared data channels to detect usage of the shared data channels; and
    causing communication on the shared data channels of an indicator comprising information on the transmission and format of at least one control part, the at least one control part indicating resource allocation for transmissions in at least one of a current downlink data part or a next uplink data part in the data channel slot on the shared data channels.

14. The method of claim 13, further comprising controlling transmission on the shared data channels using a downlink data channel slot by sensing traffic on the shared spectrum for obtaining a sensing result during the sensing period of the data channel slot and making a decision whether to transmit or not during a data part period of the data channel slot on the basis of the sensing result.

15. The method of claim 13, further comprising determining the control part format on the basis of the sensing result.

16. The method of claim 13, further comprising selecting the control part format from a set of predetermined formats on the basis of the sensing result.

17. The method of claim 13, wherein the indicator of the control part format comprises an indication of a number of control parts to be transmitted.

18. A method in a communication system, the method comprising:
- controlling the reception of an indicator on shared data channels, the indicator comprising information on the transmission and format of at least one control part, the at least one control part indicating resource allocation for transmissions in at least one of a current downlink data part or a next uplink data part in a data channel slot on the shared data channels, and
- utilizing the information when receiving and processing the at least one control part.

19. The method of claim 18, further comprising determining from the indicator whether there is data transmission on shared spectrum.

20. The method of claim 18, wherein the control part format is one from a set of predetermined formats.

* * * * *